(12) United States Patent
Endo

(10) Patent No.: US 9,853,729 B2
(45) Date of Patent: Dec. 26, 2017

(54) INTER-VEHICLE COMMUNICATION SYSTEM

(71) Applicant: Koito Manufacturing Co., Ltd., Tokyo (JP)

(72) Inventor: Osamu Endo, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 103 days.

(21) Appl. No.: 14/718,609

(22) Filed: May 21, 2015

(65) Prior Publication Data

US 2015/0349885 A1  Dec. 3, 2015

(30) Foreign Application Priority Data

May 29, 2014  (JP) ................................ 2014-110737

(51) Int. Cl.
*H04B 10/116* (2013.01)
*H04W 4/00* (2009.01)

(52) U.S. Cl.
CPC .......... *H04B 10/116* (2013.01); *H04W 4/008* (2013.01)

(58) Field of Classification Search
CPC ....... G08G 1/04; G08G 1/22; B60R 2300/605
See application file for complete search history.

(56) References Cited

U.S. PATENT DOCUMENTS

2007/0223702 A1* 9/2007 Tengler ................. H04L 9/3263
380/270

2008/0158015 A1* 7/2008 Hammes ............... B60R 25/246
340/991

(Continued)

FOREIGN PATENT DOCUMENTS

JP  2008-098931 A  4/2008
JP  2008-172496 A  7/2008

(Continued)

OTHER PUBLICATIONS

An Office Action dated Sep. 20, 2016, issued from the Korean Patent Office (KIPO) of Korean Patent Application No. 10-2015-0074017 and an English translation thereof.

*Primary Examiner* — Jerrah Edwards
*Assistant Examiner* — Matthew Franklin Gordon
(74) *Attorney, Agent, or Firm* — Abelman, Frayne & Schwab

(57) ABSTRACT

The present disclosure provides an inter-vehicle communication system configured to detect a vehicle as a communication target of DSRC to properly establish an automatic driving system. In the inter-vehicle communication system configured to perform communication between a plurality of vehicles using DSRC, each of vehicles includes an identification code (ID) of the vehicle in information to be transmitted by a DSRC unit. Each vehicle includes: an individual communication unit (optical communication unit) for optical communication, which is configured to transmit/receive IDs of vehicles through communication between individual vehicles; and a unit configured to detect information having a corresponding ID by collating the ID received by the individual communication unit with the ID included in the information received by the DSRC unit. Through ID collation, a communication counterpart vehicle of DSRC is detected.

3 Claims, 6 Drawing Sheets

(56) References Cited

U.S. PATENT DOCUMENTS

| | | | |
|---|---|---|---|
| 2010/0082195 A1* | 4/2010 | Lee | B62D 15/025 |
| | | | 701/25 |
| 2010/0256835 A1* | 10/2010 | Mudalige | G08G 1/163 |
| | | | 701/2 |
| 2012/0022776 A1* | 1/2012 | Razavilar | G01C 21/3697 |
| | | | 701/482 |
| 2014/0091911 A1* | 4/2014 | Ho | G06K 7/01 |
| | | | 340/10.42 |
| 2014/0122014 A1* | 5/2014 | Flik | G06K 9/00791 |
| | | | 702/141 |

FOREIGN PATENT DOCUMENTS

| | | |
|---|---|---|
| JP | 2009-182826 A | 8/2009 |
| KR | 10-2005-0058007 A | 6/2005 |
| KR | 10-1044359 B1 | 6/2011 |

* cited by examiner

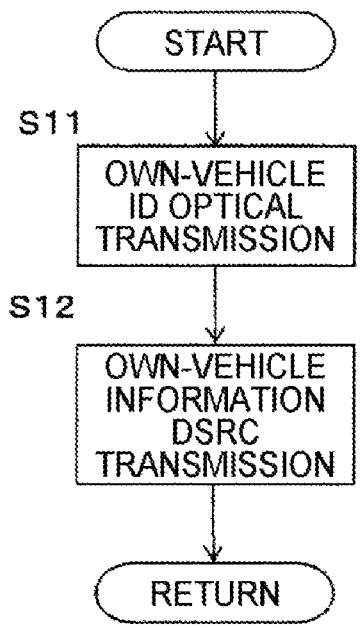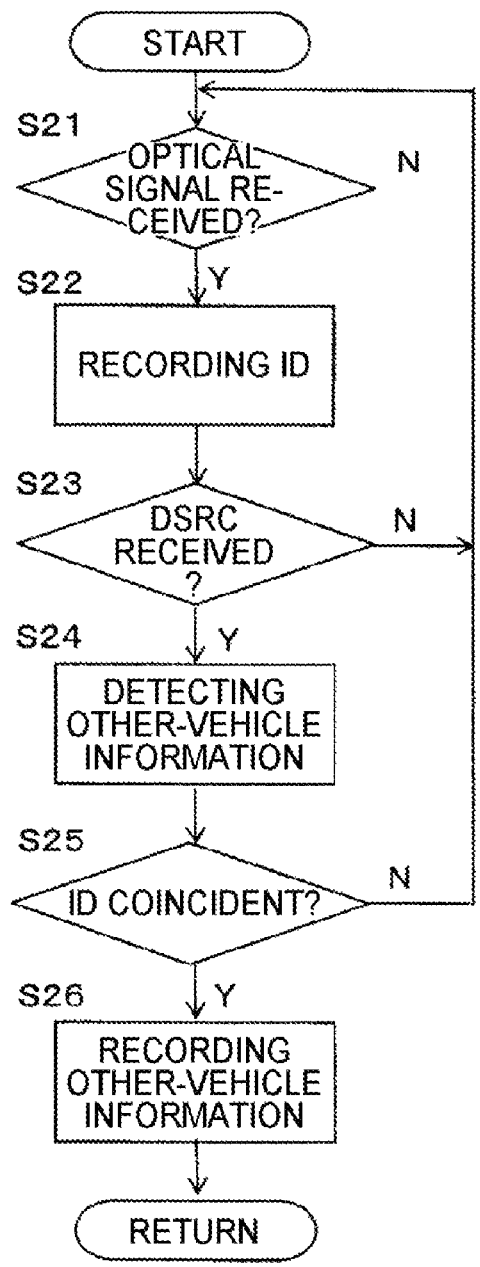

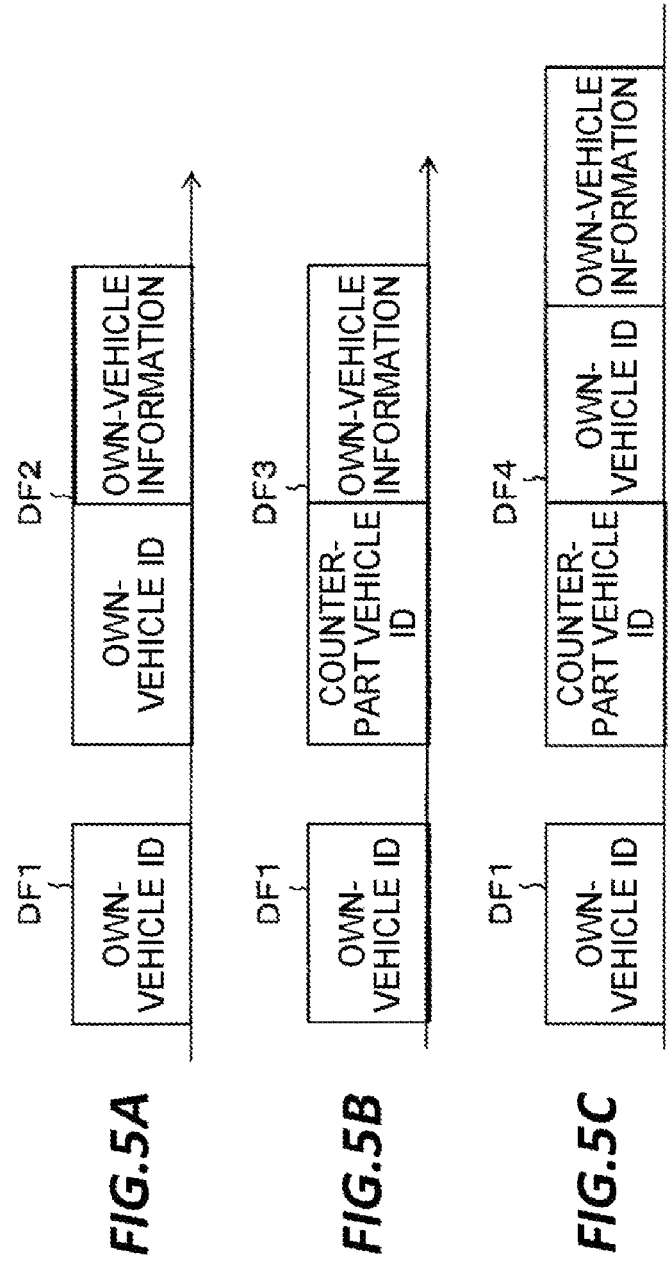

INTER-VEHICLE COMMUNICATION SYSTEM

CROSS-REFERENCE TO RELATED APPLICATIONS

This application is based on and claims priority from Japanese Patent Application No. 2014-110737, filed on May 29, 2014, with the Japan Patent Office, the disclosure of which is incorporated herein in its entirety by reference.

TECHNICAL FIELD

The present disclosure relates to an inter-vehicle communication system which performs communication between vehicles using dedicated short range communication (DSRC), and particularly to an inter-vehicle communication system suitable for performing DSRC with a vehicle present around an own-vehicle.

BACKGROUND

Japanese Patent Laid-Open Publication Nos. 2008-98931 and 2008-172496 disclose a technology for performing inter-vehicle communication using DSRC between automobiles. With the use of such inter-vehicle communication, when, for example, an automatic driving system including a preceding vehicle and a following vehicle is established, transmission of travel information of the preceding vehicle such as, for example, a vehicle speed, a steering angle, and an acceleration or deceleration, to the following vehicle is enabled by performing the inter-vehicle communication between the following vehicle and the preceding vehicle, and as a result, a proper automatic driving control may be implemented in the following vehicle. Since the DSRC may be applicable to road-vehicle communication, information obtained from the road-vehicle communication and information obtained from the inter-vehicle communication may be combined with each other so as to implement a more effective automatic driving control.

SUMMARY

In the suggested inter-vehicle communication using the DSRC, it is possible to add an ID (identification code) configured to identify a vehicle of a transmission source to a signal transmitted from the vehicle, together with travel information. Accordingly, it becomes possible for a vehicle which has received the signal to recognize the ID added to the signal to identify a communication counterpart vehicle. In the case of the example as described above, when the travel information is transmitted from the preceding vehicle, the travel information is transmitted after the ID of an own-vehicle is added to the travel information. Upon receiving the signal, the following vehicle is capable of confirming that the received signal is a signal transmitted from the preceding vehicle by identifying the ID in the received signal, and upon acquiring the travel information in the signal, the following vehicle will perform an automatic driving control of the own-vehicle.

However, since the ID of each vehicle is a specific code, it is impossible for the own-vehicle to know an ID of another strange vehicle the own-vehicle happens to encounter while traveling on a road. Accordingly, in a situation where a plurality of vehicles are present around the own-vehicle, for example, in a situation where a preceding vehicle in front of the own-vehicle, a following vehicle behind the own-vehicle, a parallel traveling vehicle next to the own-vehicle, and an oncoming vehicle are present, even when the own-vehicle receives a signal, and recognizes an ID in the received signal, it is almost impossible for the own-vehicle to identify a communication counterpart vehicle which has transmitted the signal.

When a plurality of signals is received through DSRC in respective vehicles, signals may be received from vehicles other than the communication counterpart vehicle. In this case, even if the ID of the communication counterpart vehicle is recognized, it takes a time to recognize IDs in all of the received signals and extract only a required signal. Thus, it is difficult to quickly acquire information required for the own-vehicle. This is an obstacle in establishing an automatic driving system using inter-vehicle communication using DSRC as described above.

An object of the present disclosure is to provide an inter-vehicle communication system configured to enable reception of information from a communication counterpart vehicle through detection of the communication counterpart vehicle in DSRC, and thus to enable establishment of a proper automatic driving system.

The inter-vehicle communication system of the present disclosure is configured to perform communication between a plurality of vehicles using DSRC. Each of the vehicles includes: an individual communication unit configured to transmit information by DSRC after incorporating an ID (identification code) of the vehicle in the information; and transmit/receive IDs of the vehicles by performing communication between the vehicles, respectively; and a unit configured to detect information required for an own-vehicle based on an ID included in information received by the DSRC.

In the present disclosure, each of the vehicles transmits a signal including an own-vehicle ID, and the information detecting unit collates the vehicle ID received by the individual communication unit with the vehicle ID included in the information received by the DSRC to detect information having a corresponding ID. Or, each vehicle transmits a signal including a counterpart vehicle ID, and the information detecting unit collates the own-vehicle ID with the counterpart vehicle ID included in the information received by the DSRC to detect information having a corresponding ID.

In the present disclosure, the individual communication unit is an optical communication unit configured to transmit/receive an ID between one vehicle and another vehicle to which an optical signal is projected from the one vehicle. Also, in this case, at least an optical transmitting unit and an optical receiving unit of the individual communication unit may be integrally embedded in a lamp of an automobile.

According to the present disclosure, when information from a plurality of other-vehicles present around the own-vehicle is received by DSRC, an ID detected from a signal obtained through the communication of the individual communication unit or an ID of the own-vehicle is collated with an ID included in the information received by the DSRC, so that information required for the own-vehicle may be detected from the information of the plurality of vehicles received by DSRC communication. Accordingly, the information of the other-vehicle required for the own-vehicle may be exactly recognized, and a control of the own-vehicle in traveling, for example, an automatic driving control may be properly performed.

When the individual communication unit is configured as an optical communication unit, the optical communication unit may be embedded in a lamp of a vehicle, so that application of the individual communication unit in the vehicle becomes easy.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIGS. 4A and 4B are flow charts illustrating a flow of inter-vehicle communication.

FIGS. 5A to 5C are configuration diagrams of data frames in communication.

DETAILED DESCRIPTION

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

Figure 1:
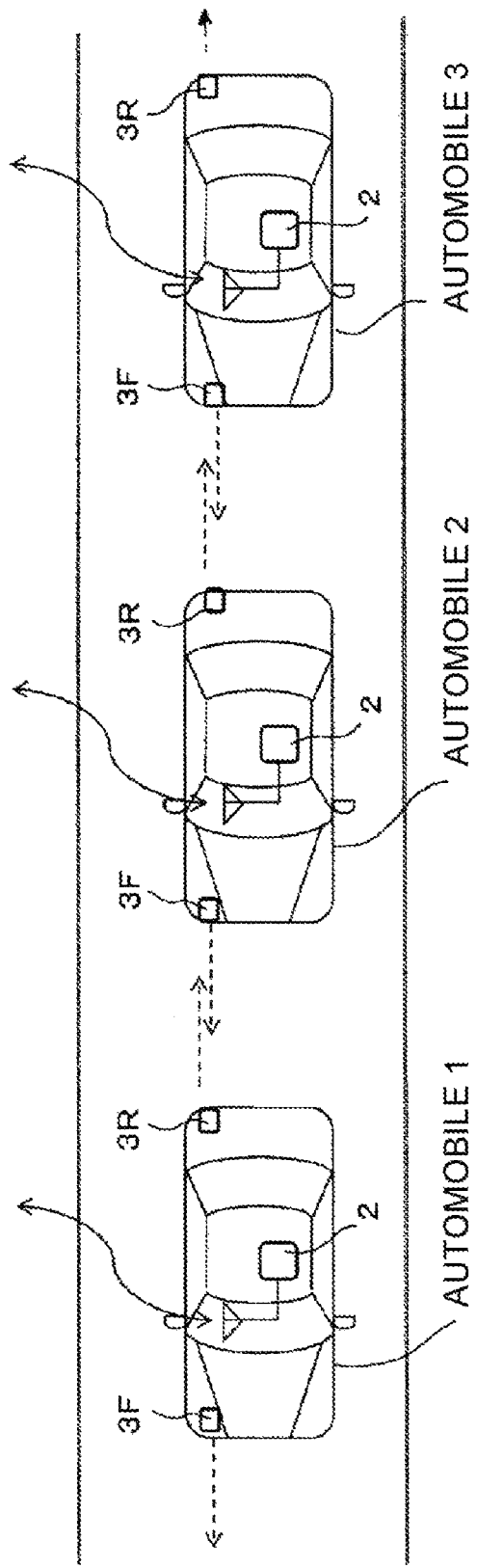
FIG. 1 is a conceptual view illustrating a configuration of an inter-vehicle communication system of the present disclosure.

Hereinafter, exemplary embodiments of the present disclosure will be described with reference to drawings. FIG. 1 is a conceptual view of an inter-vehicle communication system which exemplifies a situation where a plurality of vehicles provided with an inter-vehicle communication system of the present disclosure (herein, three automobiles in total (from a leading first vehicle CAR1 to a trailing third vehicle CAR3)) are traveling on the same road in a tandem state. These automobiles CAR1 to CAR3 may communicate with each other using the inter-vehicle communication system according to the present disclosure. Each of the automobiles CAR1 to CAR3 is also equipped with an automatic driving system as described below, and the inter-vehicle communication system of the present disclosure is configured in association with the automatic driving systems.

Figure 2:
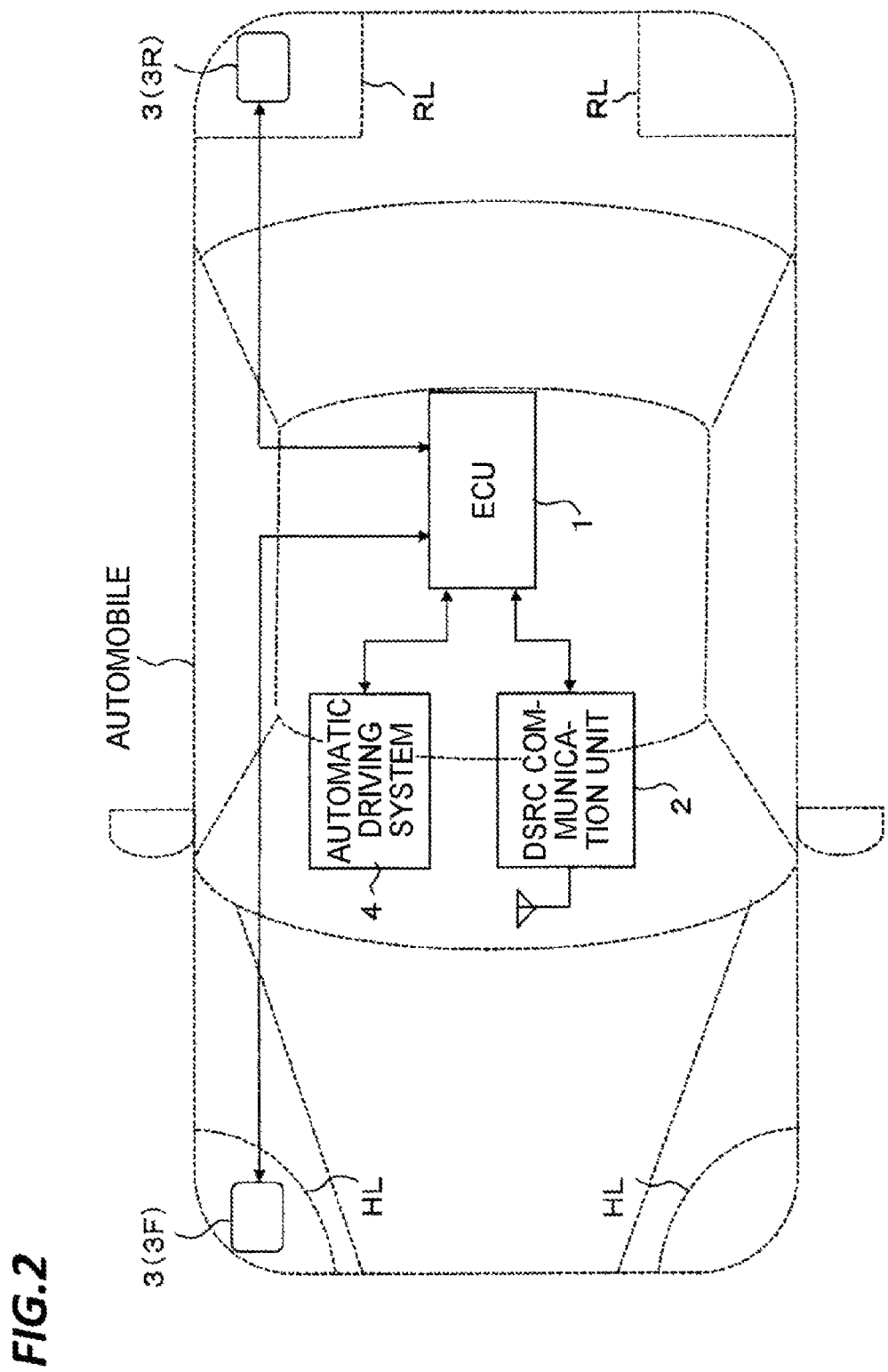
FIG. 2 is a schematic view illustrating an inter-vehicle communication system of an automobile.

FIG. 2 is a view illustrating an inter-vehicle communication system between vehicles which are represented by an automobile CAR. Each automobile CAR is provided with a DSRC communication unit 2 and an optical communication unit 3 in order to establish an inter-vehicle communication system of the present disclosure. The DSRC communication unit 2 is configured as a communication device for performing short range wireless communication in a frequency band of 5.8 GHz. The DSRC communication unit 2 is configured to perform wireless communication with a vehicle present in the vicinity thereof so that required information may be transmitted/received therebetween. Of course, it is possible to perform wireless communication between a road and a vehicle. The DSRC communication unit 2 is mounted in a required location within the car body of the automobile CAR, and is configured to transmit/receive a wireless signal through an antenna ANT arranged at a part of the car body so that communication may be performed between a plurality of automobiles present in the vicinity thereof, for example, between three automobiles CAR1 to CAR3 illustrated in FIG. 1.

The optical communication unit 3 is configured to individually and mutually perform optical communication with an other-vehicle. The optical communication unit 3 is embedded in each of the front portion and the rear portion of each automobile, especially, at each of a head lamp HL provided on the front portion of the automobile CAR and a rear lamp RL provided on the rear portion. Here, the optical communication unit 3 is provided in each of the head lamp HL and the rear lamp RL provided at the right side of the automobile CAR. In the head lamp HL, a front optical communication unit 3F is embedded in a lamp housing (not illustrated), in which the lamp housing includes a lamp unit (not illustrated) embedded therein to irradiate light in a desired distribution. The front optical communication unit 3F is configured to perform optical communication with an other-vehicle present ahead of the own-vehicle. In the rear lamp RL, a rear optical communication unit 3R is embedded in a lamp housing (not illustrated), in which the lamp housing is configured integrally with a tail lamp unit or a backup lamp unit (not illustrated). The rear optical communication unit 3R is configured to perform optical communication with an other-vehicle present behind the own-vehicle.

The automobile CAR is provided with an automatic driving system unit 4, besides the DSRC communication unit 2 and the optical communication unit 3, and the automatic driving system unit 4, the DSRC communication unit 2, and the optical communication unit 3 are connected to an electronic control unit (ECU) 1 of the automobile CAR. The ECU 1 is configured to control the automatic driving system unit 4 based on information of the own-vehicle acquired by itself, and information of other-vehicles acquired by the DSRC communication unit 2 and the optical communication unit 3 so as to perform a proper automatic driving.

Figure 3:
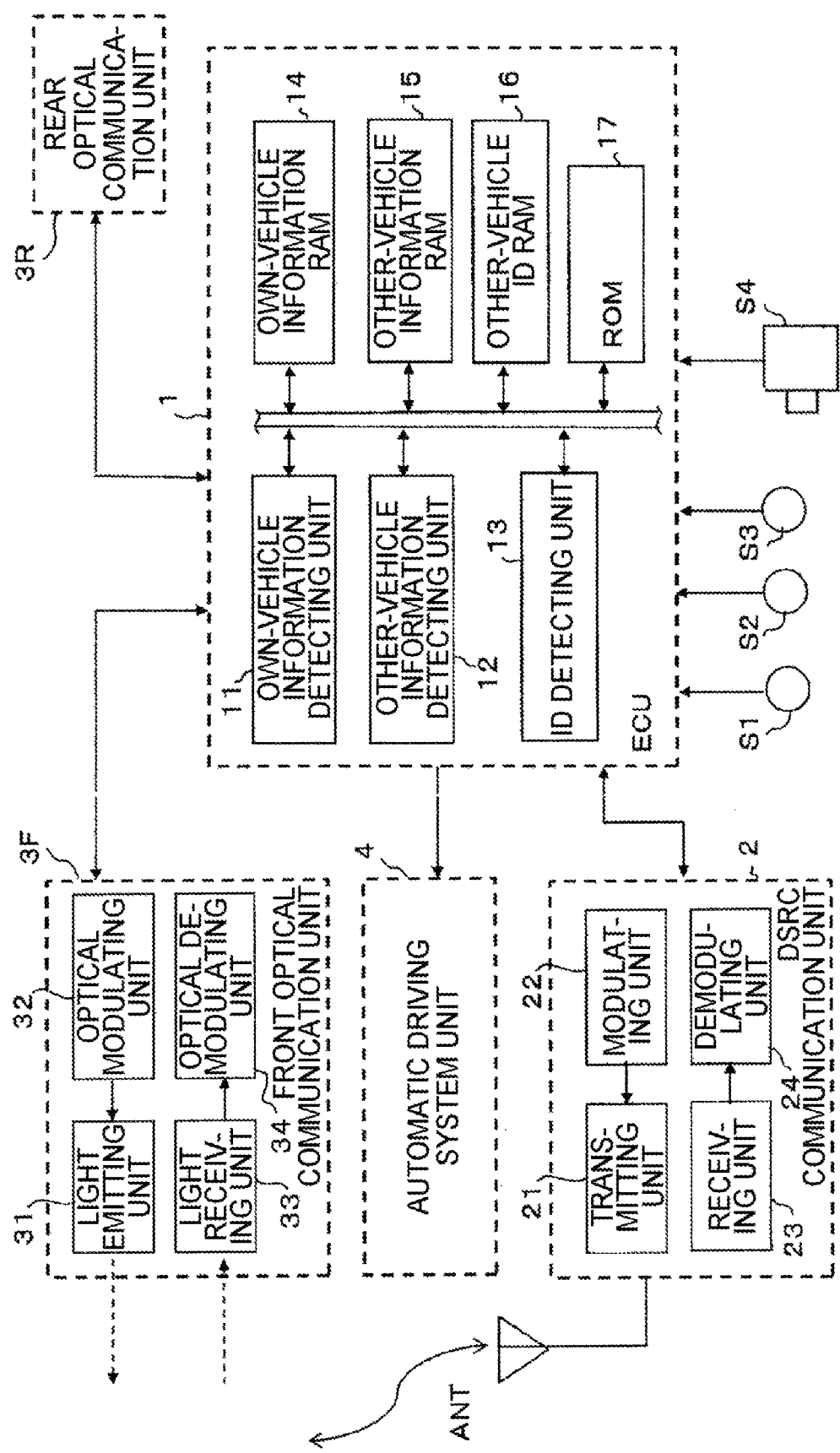
FIG. 3 is a block diagram illustrating respective units of the inter-vehicle communication system in detail.

FIG. 3 is a block configuration diagram of the ECU 1, the DSRC communication unit 2, and the optical communication unit 3 which constitute the inter-vehicle communication system of the present disclosure. The ECU 1 is connected to, for example, various sensors or a surveillance camera configured to detect travel information of the own-vehicle or road information on a road on which the own-vehicle is traveling, as described below. Here, as an example, it is assumed that a vehicle speed sensor S1, a steering angle sensor S2, and an acceleration sensor S3 are connected to detect a vehicle speed, a steering angle, and an acceleration of the own-vehicle, and a surveillance camera S4 is also connected to image a surrounding area of the own-vehicle and to detect road information such as, for example, a state of a road on which the own-vehicle is travelling.

The ECU 1 includes an own-vehicle information detecting unit 11 and an own-vehicle information RAM 14. The own-vehicle information detecting unit 11 is configured to detect travel information such as, for example, a vehicle speed, a steering direction, or an acceleration and deceleration of the own-vehicle, or road information such as a straight path, a curved path, or a junction, based on the output of each of the sensors S1 to S3, or the surveillance camera S4 (hereinafter, both travel information and road information will be referred to as "own-vehicle information"). The own-vehicle information RAM 14 is configured to record the detected own-vehicle information. The ECU 1 also includes an other-vehicle information detecting unit 12 configured to detect travel information and road information of other-vehicles (hereinafter, referred to as other-vehicle information) by the DSRC communication unit 2 and an other-vehicle information RAM 15 configured to record the detected other-vehicle information. The ECU 1 also includes an ID detecting unit 13 configured to detect IDs (identification codes) of the other-vehicles by the optical communication unit 3, and an other-vehicle ID RAM 16 configured to record the detected IDs of other-vehicles. Also, the ECU 1 includes a ROM 17 in which the ID of the own-vehicle is set to identify the own-vehicle.

The DSRC communication unit 2 includes a modulating unit 22 configured to modulate a carrier signal (carrier wave) by the own-vehicle information which is detected by the ECU 1 and recorded in the own-vehicle RAM 14, and a transmitting unit 21 configured to transmit the modulated signal through an antenna ANT. Also, the DSRC communication unit 2 includes a receiving unit 23 configured to receive a signal transmitted from an other-vehicle through the antenna ANT, and a demodulating unit 24 configured to demodulate the received signal and acquire the other-vehicle information included in the demodulated signal. The other-vehicle information demodulated by the demodulating unit 24 is output to the other-vehicle information detecting unit 12 of the ECU 1. Here, detection for an other-vehicle as a detection target is performed as described below. As for the configuration of the DSRC communication unit 2, a conventional configuration adapted in an existing ITS system or an existing ETC system may be used as it is.

The optical communication unit 3 includes a front optical communication unit 3F and a rear optical communication unit 3R as described above. As FIG. 3 illustrates the front optical communication unit 3F, each of these communication units includes an optical modulating unit 32 configured to optically modulate the own-vehicle ID set in the ROM 17 of the ECU 1 into a modulated signal, and a light emitting unit 31 serving as an optical transmitting unit configured to output an optical signal which is optically modulated. The optical communication unit 3 includes a light receiving unit 33 serving as an optical receiving unit configured to receive an optical signal output from an other-vehicle, and an optical demodulating unit 34 configured to demodulate an other-vehicle ID from the received optical signal. Then, the demodulated other-vehicle ID is output to the ID detecting unit 13 of the ECU 1 and recorded in the other-vehicle ID RAM 16.

The light emitting unit 31 in the optical communication unit 3 is composed of light emitting elements such as, for example, laser diodes (LD) or light emitting diodes (LED). The optical modulating unit 32 is configured to perform various types of modulations (such as amplitude modulation (optical intensity modulation), pulse width modulation, or pulse code modulation) of the optical signal in the light emitting unit 31 based on an input electrical signal. Accordingly, the light emission of the LDs or LEDs constituting the light emitting unit 31 is controlled so that light is output from the head lamp HL or the rear lamp RL toward the front side, the rear side or the surrounding area of the own-vehicle as described above. Meanwhile, the light receiving unit 33 is composed of, for example, photodiodes, and is configured to receive the optical signal output from an other-vehicle, and to output a photo-electrically converted electrical signal to the optical demodulating unit 34. In the configuration employed herein, the light emitting unit 31 and the light receiving unit 33 are arranged within a lamp housing, and other units are arranged outside the lamp housing. The rear optical communication unit 3R also has the same configuration.

Since the present disclosure relates to the inter-vehicle communication system, detailed descriptions of the automatic driving system unit 4 are omitted herein. Meanwhile, the ECU 1 outputs the own-vehicle information recorded in the own-vehicle information RAM 14 toward the automatic driving system unit 4. At the same time, the other-vehicle information received by the DSRC communication unit 2 and recorded in the other-vehicle information RAM 15 is output toward the automatic driving system unit 4. Accordingly, the automatic driving system unit 4 may perform an automatic driving control based on the own-vehicle information, and here, may achieve a more proper automatic driving control with reference to the other-vehicle information.

First Exemplary Embodiment

Descriptions will be made on a first exemplary embodiment of an automatic driving control in an automobile provided with the automatic driving system and the inter-vehicle communication system as described above. FIGS. 4A and 4B are flow charts illustrating a schematic flow of an automatic driving control. The automobile, as illustrated in FIG. 4A, first, transmits an own-vehicle ID through the optical communication unit 3 (S11), and then transmits own-vehicle information through the DSRC communication unit 2 (S12).

For example, as illustrated in FIG. 1, when first to third vehicles CAR1 to CAR3 are traveling in a close state, each vehicle outputs an own-vehicle ID by the optical communication unit 3, as an optical signal. That is, each of the front optical communication unit 3F and the rear optical communication unit 3R performs optical modulation by the optical modulating unit 32 based on the own-vehicle ID set in the ROM 17 of the ECU 1, and emits the optical signal optically modulated from the light emitting unit 31. In the example of FIG. 1, each of vehicles CAR1 to CAR3 transmits optical signals from the front optical communication unit 3F arranged in a head lamp HL and the rear optical communication unit 3R arranged in a rear lamp RL toward the front side and rear side of the own-vehicle, respectively.

In each vehicle, in the ECU 1 of the own-vehicle, based on the output of each of the sensors S1 to S3 or the surveillance camera S4, the own-vehicle information is detected by the own-vehicle information detecting unit 11, and the detected own-vehicle information is recorded in the own-vehicle information RAM 14. After the own-vehicle ID is transmitted by the optical communication unit 3, the own-vehicle information recorded in the own-vehicle information RAM 14 is output to the DSRC communication unit 2. The DSRC communication unit 2 constitutes a data frame based on the own-vehicle ID recorded in the ROM 17 of the ECU 1, and the input own-vehicle information. FIG. 5A illustrates a data frame DF1 including the own-vehicle ID in the optical communication unit 3, and a data frame DF2 constituted by the own-vehicle ID and the own-vehicle information in the DSRC communication unit 2. The DSRC communication unit 2 modulates a carrier signal by the modulating unit 22 based on the data frame DF2, and transmits the modulated signal from the transmitting unit 21 (S12).

Meanwhile, as illustrated in FIG. 4B, each vehicle receives an optical signal transmitted from an other-vehicle in the optical communication unit 3 (S21). Through optical communication in the optical communication unit 3, optical communication is individually performed to transmit/receive the data frame DF1 including the ID between a preceding vehicle and a following vehicle. In FIG. 1, when an optical signal is transmitted to the front side from the front optical communication unit 3F of the second vehicle CAR2, the first vehicle CAR1 present at the front side receives the optical signal through the rear optical communication unit 3R. Accordingly, the first vehicle CAR1 and the second vehicle CAR2 individually perform communication. This also applies to the second vehicle CAR2 and the third vehicle CAR3.

The vehicle, which has received an optical signal, demodulates the optical signal (the data frame DF1) received by the light receiving unit 33 in the optical demodulating unit 34, and acquires the ID of the communication counterpart in the ID detecting unit 13 of the ECU 1 and records the acquired ID in the other-vehicle ID RAM 16 (S22). In the example of FIG. 1, the second vehicle CAR2 acquires the ID of the first vehicle CAR1 and the ID of the third vehicle CAR3. This is the same in the first vehicle CAR1 and the third vehicle CAR3, and each of the first vehicle CAR1 and the third vehicle CAR3 acquires the ID of the second vehicle CAR2, and records the acquired ID in the other-vehicle ID RAM 16.

Then, each vehicle receives a signal (a data frame DF2) transmitted from the other-vehicle in the receiving unit 23 of the DSRC communication unit 2 (S23), and demodulates the received signal in the demodulating unit 24. Then, the vehicle outputs a frame unit which includes the other-vehicle ID and the other-vehicle information included in the demodulated data frame DF2 to the other-vehicle information detecting unit 12 of the ECU 1 (S24). For example, the second vehicle CAR2 outputs the first vehicle ID and the first vehicle information transmitted from the first vehicle, as one frame, and the third vehicle ID and the third vehicle information transmitted from the third vehicle CAR3, as another frame, to the other-vehicle information detecting unit 12.

Then, the other-vehicle information detecting unit 12 detects each ID from one or more received frames, and collates the detected ID with the ID recorded in the other-vehicle ID RAM 16 (S25). Then, the other-vehicle information detecting unit 12 extracts a frame which includes the ID corresponding to the other-vehicle ID recorded in the other-vehicle ID RAM 16, and detects the other-vehicle information included in the frame. The detected other-vehicle information in the frame is recorded in the other-vehicle information RAM 15 of the ECU 1 (S26). This recording is performed such that the other-vehicle present at the front or rear side of the own-vehicle corresponds to vehicle information of the other-vehicle.

Figure 6:
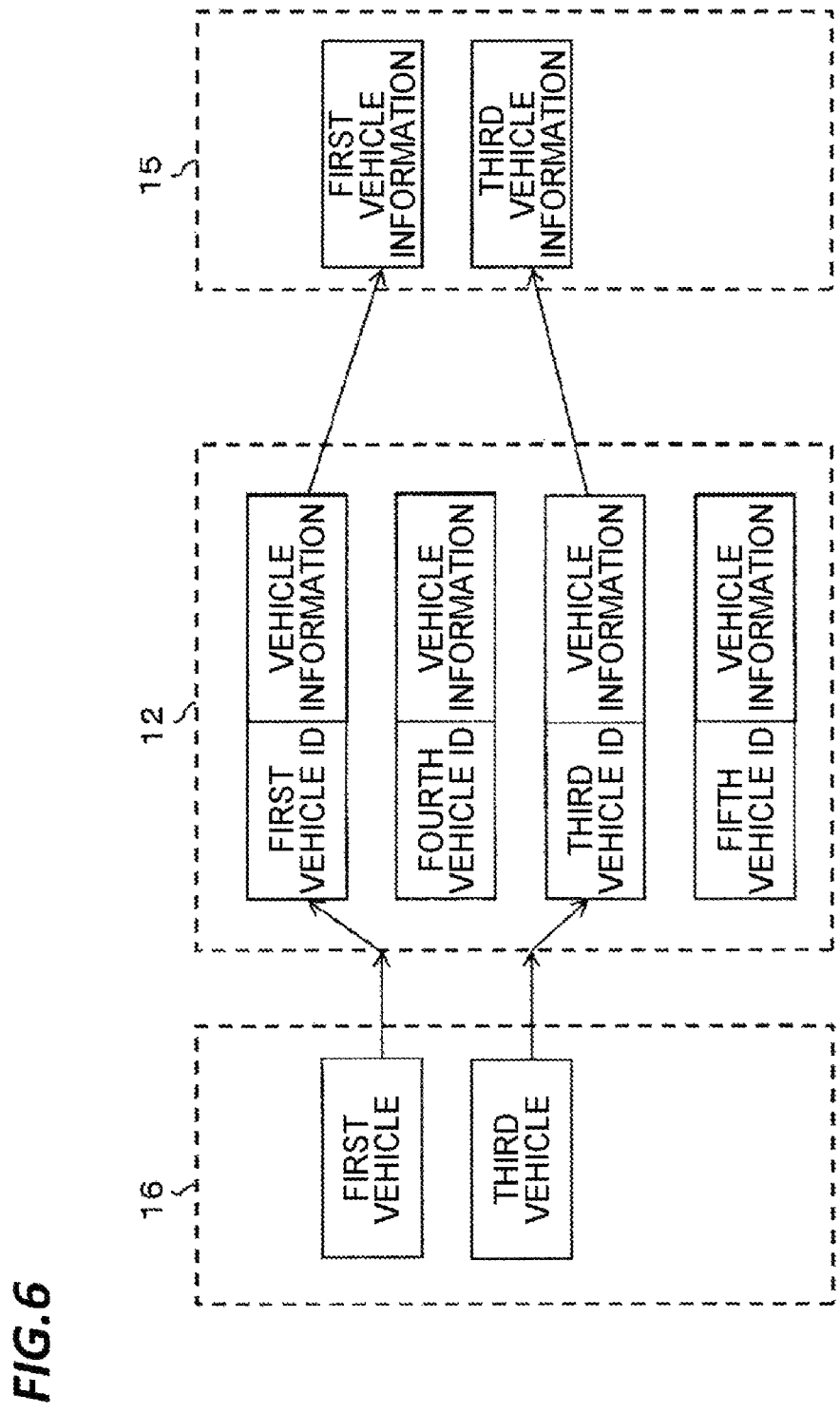
FIG. 6 is a schematic view illustrating a method of acquiring other-vehicle information.

For example, as schematically illustrated in FIG. 6, in the second vehicle CAR2, IDs of the first vehicle CAR1 and the third vehicle CAR3 acquired by the optical communication unit 3 are recorded in the other-vehicle ID RAM 16. In the DSRC communication unit 2, due to the characteristic of the DSRC communication, besides the first vehicle CAR1 and the third vehicle CAR3 at the front and rear sides of the exemplary embodiment, signals from a plurality of other-vehicles, that is, a fourth vehicle and a fifth vehicle present around the second vehicle CAR2 (although not illustrated in FIG. 1) are also received. In the other-vehicle information detecting unit 12 of the ECU 1, the respective IDs of the first vehicle and the third vehicle are collated with IDs included in the signals of the plurality of other-vehicles so that vehicle information of the first vehicle and the third vehicle having corresponding IDs may be identified and detected. The second vehicle CAR2 identifies the vehicle information of the preceding first vehicle CAR1, and the vehicle information of the following third vehicle CAR3 and records the identified information in the other-vehicle information RAM 15.

When the automatic driving control is executed by the automatic driving system in the own-vehicle, the ECU 1 outputs the own-vehicle information recorded in the own-vehicle information RAM 14 to the automatic driving system unit 4, and also outputs the other-vehicle information recorded in the other-vehicle information RAM 15 to the automatic driving system unit 4. The automatic driving system unit 4 controls the vehicle speed or steering direction of the own-vehicle based on the own-vehicle information, while executing an automatic driving by correcting the vehicle speed or steering direction with reference to the other-vehicle information. Here, with respect to the other-vehicle information, a proper automatic driving to follow the preceding vehicle becomes possible mainly with reference to information of the other-vehicle preceding in front of the own-vehicle. For example, in the exemplary embodiment, when the automatic driving control is performed in the second vehicle CAR2, a proper automatic driving becomes possible with reference to vehicle information of the preceding first vehicle CAR1.

In this manner, in a case where the automatic driving control is performed with reference to the other-vehicle information obtained by DSRC communication, when a plurality of other-vehicles are present around the own-vehicle, it is difficult to identify which one of other-vehicles corresponds to other-vehicle information received by DSRC in the own-vehicle. Meanwhile, in the present disclosure, it is possible to identify which one of vehicles corresponds to the other-vehicle information received by the DSRC communication by acquiring the other-vehicle ID through the optical communication. Especially, in the optical communication, it is easy to identify the other-vehicle as a target of the optical communication by using straightness of light. Thus, a specific other-vehicle ID may be exactly detected. Accordingly, vehicle information of the other-vehicle which affects the automatic driving may be exactly detected so that a proper automatic driving control may be achieved.

Second Exemplary Embodiment

Here, in the present disclosure, a second exemplary embodiment as described below may be employed. That is, in step S11 of FIG. 4A, after the own-vehicle ID is transmitted by the optical communication unit 3, before transmission through DSRC is performed in step S12 in FIG. 4A, first, steps S21 and S22 in FIG. 4B are performed. An ID of the communication counterpart vehicle is acquired, and is recorded in the other-vehicle ID RAM 16 of the ECU 1. Then, step S12 in FIG. 4A is executed. Here, the DSRC communication unit 2 sets the other-vehicle ID acquired by the optical communication unit 3 as a counterpart vehicle ID, and constitutes a data frame by the counterpart vehicle ID and own-vehicle information to be transmitted. FIG. 5B illustrates a data frame DF3 which includes the counterpart vehicle ID of the communication counterpart vehicle, and the own-vehicle information to be transmitted. The DSRC communication unit 2 modulates a carrier signal by the modulating unit 22 based on the data frame DF3, and transmits the modulated signal from the transmitting unit 21.

The communication counterpart vehicle, which has received the signal in step S23 of FIG. 4B, receives the signal (data frame DF3) transmitted from the other-vehicle by the receiving unit 23 of the DSRC communication unit 2, and demodulates the received signal by the demodulating unit 24. In steps S24 and S25, in this case, the counterpart vehicle ID included in the demodulated data frame DF3 is collated with the own-vehicle ID recorded in the ROM 17 of the ECU 1. Then, the communication counterpart vehicle extracts a data frame including the counterpart vehicle ID corresponding to the own-vehicle ID from a plurality of received signals, and detects other-vehicle information included in the frame. The other-vehicle information in the detected frame is recorded in the other-vehicle information RAM 15 of the ECU 1 (S26). Based on the other-vehicle information recorded in the other-vehicle information RAM 15, the automatic driving control of the own-vehicle is performed in the same manner as in the first exemplary embodiment so that a proper automatic driving control may be achieved.

However, the second exemplary embodiment is effective in a case where a counterpart vehicle which performs steps S11, S21 and S22 of FIGS. 4A and 4B in the optical communication unit 3 is specified by one vehicle. For example, when optical communication is performed by any one of the front optical communication unit 3F and the rear optical communication unit 3R, it is specified which one of the preceding first vehicle CAR1 and the following third vehicle CAR3 is a counterpart vehicle of the optical communication. In this manner, when the other-vehicle ID is acquired through the optical communication with only a specific other-vehicle, only the other-vehicle as a communication counterpart in the optical communication acquires an ID of the own-vehicle. Accordingly, when the counterpart vehicle ID included in the received signal is coincident with the own-vehicle ID, the counterpart vehicle which has transmitted the signal may be specified as a vehicle of the other-vehicle ID obtained through the optical communication, and other-vehicle information of the communication counterpart vehicle may be detected.

Accordingly, in the second exemplary embodiment, when the own-vehicle extracts only a signal in which the counterpart vehicle ID included in the data frame DF3 is coincident with the own-vehicle ID, from the plurality of signals received by the DSRC, it is momentarily detected that the signal has been transmitted from the specific other-vehicle, and vehicle information of the specific other-vehicle may be detected. For example, in the second vehicle CAR2 of FIG. 1, when the other-vehicle ID is acquired through the optical communication only with the first vehicle CAR1 by the front optical communication unit 3F, the first vehicle CAR1 may also acquire a vehicle ID of the second vehicle CAR2 simultaneously. Thus, when the second vehicle CAR2 receives a signal including a vehicle ID of the own-vehicle, it is possible to detect that the vehicle as the communication counterpart is the first vehicle CAR1 which acquires an own-vehicle ID. Accordingly, an automatic driving control with a high responsiveness may be achieved.

Third Exemplary Embodiment

In the third exemplary embodiment, when step S12 in FIG. 4A is executed after the other-vehicle ID is detected through the optical communication in steps S11, S21, and S22 in FIGS. 4A and 4B in the same manner as in the second exemplary embodiment, the DSRC communication unit 2 sets the other-vehicle ID as a counterpart vehicle ID, the other-vehicle ID being acquired by the optical communication unit 3 and recorded in the other-vehicle ID RAM 16 of the ECU 1. Then, the DSRC communication unit 2 constitutes a data frame based on the other-vehicle ID, the own-vehicle ID recorded in the ROM 17, and own-vehicle information to be transmitted as illustrated in FIG. 5C. FIG. 5C illustrates a data frame DF4 which includes the counterpart vehicle ID of the communication counterpart vehicle, the own-vehicle ID, and the own-vehicle information to be transmitted. Then, the DSRC communication unit 2 modulates a carrier signal by the modulating unit 22 based on the data frame DF4, and transmits the modulated signal from the transmitting unit 21.

In this exemplary embodiment, in steps S23, S24 and S25 of FIG. 4B, first, the counterpart vehicle ID included in the data frame DF4 obtained by demodulating the received signal of the DSRC is collated with the own-vehicle ID recorded in the ROM 17 of the ECU 1. Then, from a plurality of received signals, data frames DF4 including the counterpart vehicle ID corresponding to the own-vehicle ID are extracted. Then, the own-vehicle IDs included in the extracted data frames DF4 are collated with the other-vehicle ID recorded in the other-vehicle ID RAM 16 of the ECU 1, and only the corresponding data frame DF4 is extracted. The subsequent processes are the same as those of the above described embodiment.

According to this exemplary embodiment, among the signals of DSRC received in the same manner as in the second exemplary embodiment, signals including the counterpart vehicle ID coincident with the own-vehicle ID, that is, only the signals transmitted toward the own-vehicle may be extracted. Thus, quick detection is enabled. Then, in the same manner as in the first exemplary embodiment, the own-vehicle IDs included in the extracted signals may be collated with the other-vehicle ID recorded in the other-vehicle ID RAM 16 so that a vehicle which has transmitted the signal may be detected, and vehicle information of the other-vehicle may be acquired. In the third exemplary embodiment, unlike the second exemplary embodiment, it is not necessary to specify the other-vehicle through optical communication in advance. Thus, more quick detection of the other-vehicle and acquisition of the information of the other-vehicle are enabled, and a proper automatic driving control with a high responsiveness can be achieved.

As described above, in the present disclosure, when vehicle information is transmitted/received between vehicles, information with a large amount of data may be quickly transmitted/received through DSRC. Also, road-vehicle communication of DSRC may be used, and road information obtained from the road-vehicle communication may be used as the vehicle information. Accordingly, a more proper automatic driving control may be possible.

Meanwhile, when an ID is transmitted/received between vehicles, optical communication is used. Thus, when the optical communication is performed with a target vehicle based on the straightness of an optical signal, the ID of the vehicle may be exactly detected. In particular, among vehicles traveling in relation to each other, the relative positions thereof are frequently and variously changed. Thus, while transmission/reception using an optical signal is continuously performed, individual communication between the vehicles may be reliably secured. The optical signal does not interfere with the signal of the DSRC, and thus does not affect the existing DSRC system.

In the exemplary embodiments described above, as illustrated in FIG. 1, when the second vehicle is the own-vehicle, other-vehicle information of other-vehicles present at the front and rear sides of the own-vehicle is detected. However, in the same manner as described above, it is also possible to detect an ID of an other-vehicle that travels in parallel to the own-vehicle (not illustrated in FIG. 1). For example, a light emitting unit and a light receiving unit of an optical communication unit may be embedded in, for example, a side marker lamp or a side turn signal lamp of an automobile, so that an optical signal is transmitted to the left side or right side of the own-vehicle and received at the left side or right side. Thus, it is possible to detect the ID of the other-vehicle that travels in parallel to the left side or right side of the own-vehicle.

Accordingly, even in a situation where a number of other-vehicles are present around the own-vehicle, and other-vehicle information of the other-vehicles may be acquired through DSRC communication with the other-vehicles, an other-vehicle ID required for an automatic driving control may be detected so that from received information on a number of other-vehicles, only required other-vehicle information may be detected. It is needless to say that the DSRC communication may be performed with other-vehicles present in the vicinity of the own-vehicle, that is, at the front or rear side or the left or right side of the own-vehicle.

A communication method is not limited to an optical communication method described in the exemplary embodiments as long as the communication method is a method capable of determining a coincidence of the other-vehicle as a communication target with a received ID. Thus, a communication unit for detecting an ID of the other-vehicle in the present disclosure may employ a wireless communication method with a high directivity.

In the exemplary embodiments described above, the inter-vehicle communication system of the present disclosure is employed in the automatic driving system. However, the present disclosure may be employed in any system as long as a plurality of vehicles transmit/receive information therebetween using DSRC in the system, and here, it is required to exactly detect a vehicle as a transmission source of the information.

In the exemplary embodiments described above, the travel information of an automobile includes, for example, a vehicle speed, a steering angle, and an acceleration, but may include information such as, for example, a pitch angle or yawing angle of a car body, and a deceleration, or information such as, for example, the number of occupants or the total weight. Meanwhile, the road information may include a road width or a road condition obtained from an image captured by a surveillance camera, or road information obtained from a navigation device. Further, the road information may include information obtained from road-vehicle communication using DSRC as described above.

In the exemplary embodiments described above, the light emitting unit and the light receiving unit of the optical communication unit are integrally embedded in the lamp of the automobile. However, the optical communication unit, in its entirety, may be integrally embedded in the lamp. When the lamp is small, the former configuration is desirable, whereas when the lamp is large, the latter configuration may be employed.

The present disclosure may be employed in an inter-vehicle communication system using DSRC.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. An inter-vehicle communication system configured to perform communication between a plurality of vehicles using dedicated short range communication (DSRC), the inter-vehicle communication system comprising:
   a DSRC communication unit configured to transmit vehicle information associated with an identification code of an own-vehicle and receive vehicle information associated with an identification code of another vehicle through the DSRC;
   an optical communication unit including an optical transmitting unit and an optical receiving unit each configured to transmit the identification code of the own-vehicle and receive the identification code of the another vehicle, respectively, by performing communication between the own-vehicle and the another vehicle to which an optical signal is projected from the own-vehicle; and
   an information detecting unit configured to compare the identification code of the another vehicle received by the optical communication unit with the identification code of the another vehicle associated with the vehicle information of the another vehicle received by the DSRC communication unit, and obtain the vehicle information of the another vehicle received by the DSRC communication unit when the identification code of the another vehicle received by the optical communication unit and the identification code of the another vehicle received by the DSRC communication unit are identical,
   wherein the optical transmitting unit and the optical receiving unit of the optical communication unit are integrally embedded in at least a head lamp and a rear lamp of the own-vehicle.

2. The inter-vehicle communication system of claim 1, wherein the information transmitted by the DSRC communication unit includes at least travel information of the own-vehicle and road information where the own-vehicle is running.

3. The inter-vehicle communication system of claim 1, wherein the inter-vehicle communication system is employed in a vehicle provided with an automatic driving system configured to perform an automatic driving control with reference to the vehicle information received by the DSRC communication unit.

* * * * *